(12) United States Patent
Kneer et al.

(10) Patent No.: US 10,364,087 B2
(45) Date of Patent: Jul. 30, 2019

(54) CONTAINER WITH AN INNER BAG

(71) Applicant: Gaplast GmbH, Altenau (DE)

(72) Inventors: Stephan Kneer, Farchant (DE); Roland Kneer, Farchant (DE)

(73) Assignee: GAPLAST GMBH, Altenau (DE)

( * ) Notice: Subject to any disclaimer, the term of this patent is extended or adjusted under 35 U.S.C. 154(b) by 0 days.

(21) Appl. No.: 15/960,869

(22) Filed: Apr. 24, 2018

(65) Prior Publication Data

US 2018/0334310 A1    Nov. 22, 2018

(30) Foreign Application Priority Data

May 16, 2017    (DE) .................. 10 2017 004 657

(51) Int. Cl.
*B65D 83/00*    (2006.01)
*B65D 1/02*    (2006.01)
(Continued)

(52) U.S. Cl.
CPC ...... *B65D 83/0055* (2013.01); *B29C 49/0005* (2013.01); *B29C 49/221* (2013.01);
(Continued)

(58) Field of Classification Search
CPC .......... B65D 1/02; B65D 83/00; B65D 25/16; B65D 23/02; B29C 49/04; Y10T 428/1317; Y10T 428/1321; Y10T 428/131
(Continued)

(56) References Cited

U.S. PATENT DOCUMENTS 6,109,468 A * 8/2000 Kneer .................. B65D 1/0215
215/378
6,691,494 B2 * 2/2004 Nomoto .............. B05B 11/3047
53/410
(Continued)

FOREIGN PATENT DOCUMENTS

DE    102010024980 A1    12/2011
EP    0912420 A1    5/1999
(Continued)

OTHER PUBLICATIONS

Search Report for corresponding German Patent application No. 10 2017 004 657.3.

*Primary Examiner* — J. Gregory Pickett
*Assistant Examiner* — Tia Cox
(74) *Attorney, Agent, or Firm* — Greer, Burns & Crain, Ltd.

(57) ABSTRACT

A container comprises a substantially rigid outer container and a readily deformable inner bag, wherein the outer container and the inner bag consist of different thermoplastic plastic materials such that the outer container and the inner bag do not undergo a weld connection with one another, with a container opening and at least one pressure balancing opening in the wall of the outer container for balancing the pressure in the gap between the outer container and the inner bag when the inner bag contracts, wherein integrated into the layer of the inner bag, which is directed towards the outer container, and/or into the layer of the outer container, which is directed towards the inner bag, are microbodies, of a material which does not melt during the manufacture of the container, which produce irregularities on the surface of the layer(s) in which microbodies are imbedded.

9 Claims, 1 Drawing Sheet

(51) Int. Cl.
- B29C 49/00 (2006.01)
- B29C 49/22 (2006.01)
- B65D 25/14 (2006.01)
- B65D 77/00 (2006.01)
- B67D 1/04 (2006.01)
- B29C 48/09 (2019.01)
- B29C 48/00 (2019.01)
- B29C 48/21 (2019.01)
- B29C 49/04 (2006.01)
- B29K 23/00 (2006.01)
- B29K 509/08 (2006.01)
- B29L 31/00 (2006.01)
- B29K 105/16 (2006.01)
- B29K 67/00 (2006.01)
- B29C 49/06 (2006.01)
- B29C 49/48 (2006.01)
- B29K 309/08 (2006.01)
- B67D 1/08 (2006.01)
- B29L 9/00 (2006.01)

(52) U.S. Cl.
CPC ........... B65D 1/0215 (2013.01); B65D 25/14 (2013.01); B65D 77/00 (2013.01); B67D 1/0462 (2013.01); B29B 2911/143 (2013.01); B29C 48/0017 (2019.02); B29C 48/09 (2019.02); B29C 48/21 (2019.02); B29C 49/04 (2013.01); B29C 49/06 (2013.01); B29C 49/22 (2013.01); B29C 49/4817 (2013.01); B29C 2049/001 (2013.01); B29K 2023/06 (2013.01); B29K 2023/086 (2013.01); B29K 2023/12 (2013.01); B29K 2067/003 (2013.01); B29K 2105/162 (2013.01); B29K 2309/08 (2013.01); B29K 2509/08 (2013.01); B29K 2995/0067 (2013.01); B29L 2009/001 (2013.01); B29L 2031/712 (2013.01); B29L 2031/7158 (2013.01); B67D 2001/0812 (2013.01); B67D 2001/0827 (2013.01)

(58) Field of Classification Search
USPC .......... 220/258.2, 723, 720, 62.11; 215/12.2; 383/33, 105; 428/32.8
See application file for complete search history.

(56) References Cited

U.S. PATENT DOCUMENTS

| | | | |
|---|---|---|---|
| 7,775,716 B2 * | 8/2010 | Ejeblad | A23G 3/28 383/105 |
| 8,857,655 B2 * | 10/2014 | Kneer | B65D 1/0215 220/723 |
| 9,199,785 B2 * | 12/2015 | Kneer | B29C 49/04 |

FOREIGN PATENT DOCUMENTS

| | | |
|---|---|---|
| EP | 2801465 A2 | 11/2014 |
| JP | 2013-103751 A | 5/2013 |
| WO | 9801366 | 1/1998 |
| WO | 2012083310 A2 | 6/2012 |

\* cited by examiner

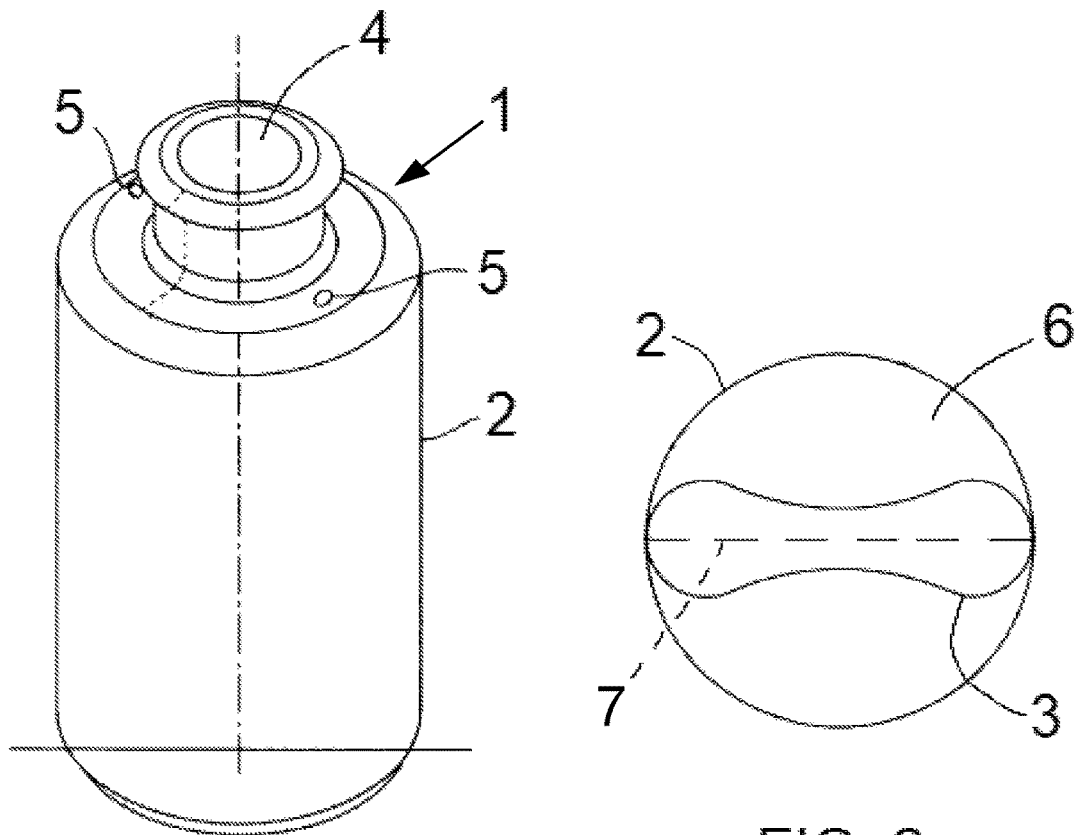
FIG. 1
(Prior Art)
FIG. 2
(Prior Art)
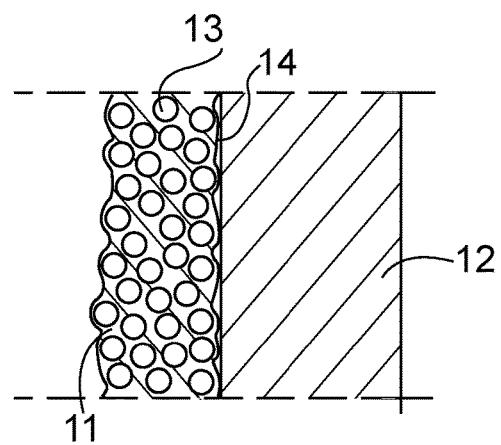
FIG. 3

CONTAINER WITH AN INNER BAG

PRIORITY

This application claims convention priority to German patent application No. 10 2017 004 657.3 filed May 16, 2017, which is hereby incorporated by reference.

FIELD OF THE INVENTION

The invention relates to containers with inner deformable bags.

SUMMARY OF THE INVENTION

The invention relates to a container 1 consisting of a substantially rigid outer container 2 and a readily deformable inner bag 3, wherein the outer container and the inner bag consist of different thermoplastic plastic materials such that the outer container and the inner bag do not undergo a weld connection with one another. The container includes a container opening 4, from which the contents of the container are discharged, and at least one pressure balancing opening 5 in the wall of the outer container for balancing the pressure in the gap 6 between the outer container and the inner bag when the inner bag contracts. The container can be produced by the coextrusion process, wherein by shaping excess material at the base of the blow mould the inner bag is sealed by a base weld seam, which is trapped in a base weld seam 7, which is also sealed, in the outer container. Such a container is disclosed in, for instance, European Patent EP0912420, which also describes how pressure balancing openings can be formed in the wall of the outer container.

The container can, however, also be produced by the injection moulding process with the material for the inner bag being injected in an injection mould into an outer container arranged therein. Such a container is disclosed in EP2801465.

When producing the container by the coextrusion process, a blank consisting of at least two tubes—one for the outer container and one for the inner container—is coextruded and arranged between the open halves of a blow mould, wherein the blow mould is closed when the blank has the length necessary for producing the container. As mentioned above, excess material at the bottom of the blow mould is shaped and squeezed so that the closed base weld seams in the outer container and the inner bag are formed.

The blank is then inflated by a pressure medium into engagement with the wall of the blow mould and removed from the blow mould.

The different plastic materials of the outer container and the inner bag do not undergo a weld connection with one another but they stick to one another with considerable adhesive forces. Before the container is filled with its contents, which are subsequently gradually discharged with a pump or a dispenser unit (squeeze) by compressing the container, the inner bag must be at least substantially detached from the wall of the outer container and then applied to it again. For this purpose, a reduced pressure is applied to the inner bag through the container opening or an increased pressure is applied to it through pressure balancing openings and thereupon the inner bag contracts and becomes detached from the outer container in a more or less uncontrolled manner, whereby it can occur that the inner bag becomes detached on only one side of the base seam. A pressure medium is then introduced through the container opening into the inner bag in order to apply it again to the outer container so that the inner bag achieves the provided filling volume.

If the inner bag is not substantially detached from the wall of the outer container, a relatively large reduced pressure can occur as a consequence of the discharge of the container contents despite the presence of pressure balancing openings in the wall or in the base of the outer container. The larger this reduced pressure, the greater is the permeation through the wall of the inner bag and the risk that it becomes leaky. If the reduced pressure becomes too large this can also impair the functioning ability of a pump or dispenser unit so that not all of the container contents can be discharged.

With certain materials for the outer container and the inner bag the adhesive forces are so great that a large reduced pressure is necessary in order to detach the inner bag. However, the inner bag generally becomes detached from the outer container differently on the two sides of the base seam and frequently only incompletely so that it can happen that not all of the container contents can be subsequently discharged. The high reduced pressure can additionally have the consequence of a permanent deformation of the inner bag so that it can no longer be applied flat, in the most unfavourable case with the formation of folds, again the outer container.

It is the object of the present invention to provide a container of the type under consideration in which the above disadvantages are avoided. This object is solved in accordance with the invention by the features of claim 1.

Advantageous embodiments of the invention are characterised in the dependent claims.

BRIEF DESCRIPTION OF THE DRAWINGS

FIG. 1 is a prior art container as shown in European Patent EP0912420.

FIG. 2 is a cross-section of the prior art container of FIG. 1 as shown in European Patent EP0912420.

FIG. 3 is a detailed cross-section of the container layers as described herein below.

DETAILED DESCRIPTION OF PREFERRED EMBODIMENTS

The invention provides that contained in the layer of the inner bag 11, which is directed towards the outer container 12, and/or in the layer of the outer container, which is directed towards the inner bag, there are microbodies 13 of a material which does not melt during the manufacture of the container, which produce irregularities on the surface 14 of the layer. The adhesion forces between this layer and the adjacent inner wall of the outer container or outer wall of the inner bag are thereby considerably reduced. It has also been found that the inner bag becomes substantially uniformly and completely detached from the outer container on both sides of the squeezed seam and may be smoothly applied again since no permanent deformation and fold formation can occur on the inner bag due to the substantially lower reduced pressure.

"Microbodies" means that very small bodies are concerned, which are smaller than the thickness of the associated outer layer of the inner bag or the layer or outer layer of the outer container. The size of the microbodies is preferably in the micro range but can also be in the nano range. What is important is that they produce irregularities on the surface of the layer.

It is preferred that the microbodies have rounded surfaces without pointed corners and sharp edges although lower adhesive forces can be produced therewith. Microbodies are however preferred with smooth, rounded surfaces, whereby an approximately spherical shape is of benefit to good processability.

Many substances are suitable as the material for the microbodies which do not melt during the manufacture of the container and maintain their shape, whereby the use of glass spheres is very suitable.

Depending on the contents of the container, the inner bag can consist of the one layer mentioned above with the integrated microbodies. Surlyn or PE is preferred as the material for this layer.

In many applications the inner bag includes at least two further layers, which preferably consist of EVOH for the middle layer and an inner layer of Surlyn or PE. The invention is, however, not limited to such a laminated structure.

The outer container preferably consists of a layer of PET or PP. The outer container can, however, consist of two or more layers.

In the coextrusion process, the microbodies can either be mixed into the associated layer material in the extruder or they are previously compounded with the material and introduced together with it into the extruder.

The outer container can have a single pressure balancing opening, which is formed in the peripheral wall or in the base wall. However, two pressure balancing openings can also be formed, which are situated on both sides of the squeezed seam. A larger number of pressure balancing openings is also within the scope of the invention.

The invention claimed is:

1. A container comprising a substantially rigid outer container and a readily deformable inner bag, wherein the outer container and the inner bag are comprised of different thermoplastic plastic materials such that the outer container and the inner bag do not undergo a weld connection with one another, with a container opening and at least one pressure balancing opening in the wall of the outer container for balancing the pressure in the gap between the outer container and the inner bag when the inner bag contracts, wherein integrated into a layer of the inner bag, which is directed towards the outer container, and/or into a layer of the outer container, which is directed towards the inner bag, are microbodies, of a material which does not melt during the manufacture of the container, which produce irregularities on the surface of the bag layer and/or the container layer into which the microbodies are integrated.

2. A container as claimed in claim 1, wherein the microbodies have rounded surfaces.

3. A container as claimed in claim 1 wherein the microbodies are of spherical shape.

4. A container as claimed in claim 1 wherein the microbodies are glass spheres.

5. A container as claimed in claim 1 wherein the layer is comprised of Surlyn or PE.

6. A container as claimed in claim 1 wherein the inner bag includes two further layers, the middle layer being comprised of EVOH and the outer layers being comprised of Surlyn or PE.

7. A container as claimed in claim 1 wherein the outer container is comprised of PET or PP.

8. A container as claimed in claim 1 wherein the container is produced by a coextrusion process, wherein when excess material at the bottom of a blow mould is squeezed the inner bag is sealed by a base weld seam and this base weld seam is also sealed in the outer container.

9. A container as claimed in claim 1 wherein the container is produced by an injection moulding process with material for the inner bag being injected in an injection mould into the outer container arranged therein.

* * * * *